Dec. 26, 1950     R. W. MATTISON     2,535,310
VALVE
Filed Aug. 14, 1945
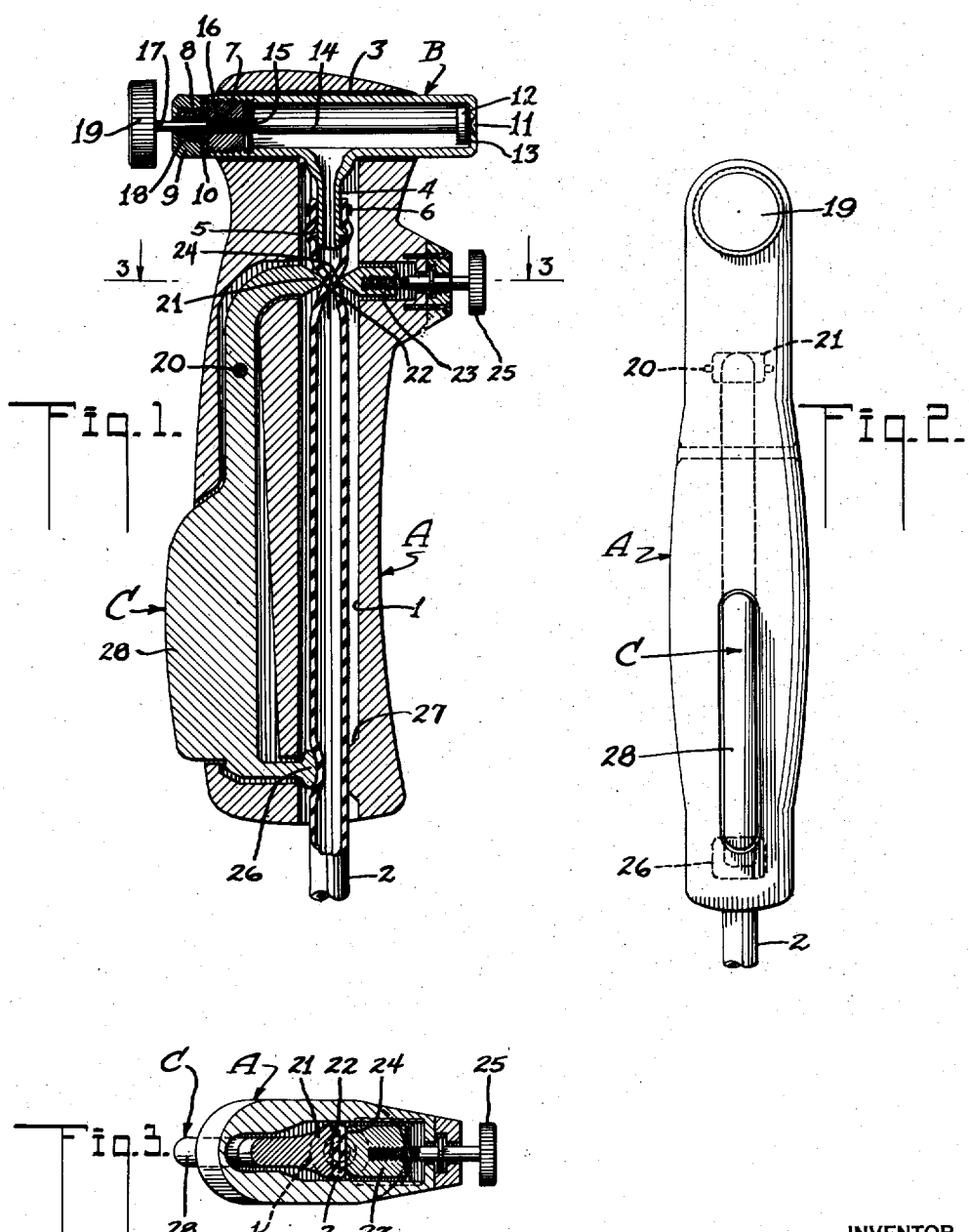
INVENTOR
*RALPH W. MATTISON*
BY
ATTORNEYS Patented Dec. 26, 1950

2,535,310

UNITED STATES PATENT OFFICE 2,535,310

VALVE

Ralph W. Mattison, Vallejo, Calif.

Application August 14, 1945, Serial No. 610,706

1 Claim. (Cl. 251—5)

An object of my invention is to provide a valve which includes a body that encloses a compressible liquid-conveying tube. A concealed support is carried by the body and contacts with the tube. A lever is pivoted to the body and has a short arm adapted to bear against the tube at a point opposite from where the tube contacts with the support. The lever has a long arm that may be manually moved when the body is grasped for swinging the short arm away from the tube and permit fluid to flow through the tube. The long arm has a projection contacting with the tube that will be acted upon by the pressure of the fluid in the tube when the long arm is freed and the pressure of the liquid in the tube in acting on the freed long arm will cause the short arm to compress the tube against the support and cut off the flow of liquid through the tube.

The device is simple in construction and is durable and efficient for the purpose intended.

Other objects and advantages will appear in the following specification, and the novel features of the device will be particularly pointed out in the appended claim.

My invention is illustrated in the accompanying drawings forming a part of this application, in which:

Figure 1 is a vertical section through the device portions being shown in elevation;

Figure 2 is a side view of the device; and

Figure 3 is a horizontal section taken along the line 3—3 of Figure 1.

While I have shown only the preferred forms of my invention, it should be understood that various changes or modifications may be made within the scope of the appended claim without departing from the spirit and scope of the invention.

In carrying out my invention I provide a casing indicated generally at A. The casing has a bore 1 therein for receiving a flexible water conveying tube 2. The bore 1 communicates with a transversely extending bore 3 and this bore has the water spray nozzle B mounted therein. The nozzle has an inlet pipe 4 that receives the end of the tube 2. The pipe 4 has an annular rib 5 over which the tube is stretched and the tube end may be secured in place by a band 6 or other suitable fastening means.

I will describe the construction of the nozzle B before describing the construction of the manually operable valve which controls the flow of water through the flexible tube 2. The body of the nozzle B is cylindrical in shape and has a plug 7 screwed into one end and acting as a closure for this end. The plug has a reduced threaded portion 8 for receiving a cap 9 and a washer 10 is placed between the cap and the nozzle body. I do not wish to be confined to the exact structure for closing the cylinder end since other closures may give the same results.

The other end of the nozzle B is closed except for a conical-shaped opening 11 through which water passes when a disc valve 12 is backed away from the inner face 13 of the cylindrical body end. The valve 12 is mounted on a valve stem 14 and this stem is threaded at 15 so as to be received in a threaded bore 16 in the plug 7. A reduced portion 17 of the stem passes through a central opening in a washer 18 that is placed between the threaded portion 8 and the cap 9. A knurled knob 19 is mounted on the reduced stem portion 17 and a turning of the knob will move the face of the valve disc 12 toward or away from the inner surface 13 so as to control the amount of water passing through the orifice 11 and also control the atomization of the water. A fine or a coarse spray is provided in this manner.

The means for controlling the flow of water to the nozzle B comprises a valve lever C that is pivoted at 20 to the casing A. Figures 1 and 3 show the upper end 21 of the lever as being wedge-shaped in vertical section and as having a wide blunt end 22 that contacts with the tube 2 so as to compress it without cutting it. A wedge member 23 has a wide blunt edge 24 bearing against the opposite side of the tube and aligned with the wide end 22. A hand screw 25 adjusts the position of the wedge 23 toward or away from the tube 2.

The opposite end of the lever C has a button-like projection 26 that bears against the tube 2. The button 26 is disposed a greater distance from the pivot point 20 than the wide end 22 and therefore the lever effect produced by the water pressure in the tube 2 on the button will cause it to swing the end 22 against the tube 2 and collapse it so that the tube will be compressed between the end 22 and the edge 24. This will cut off the flow of water to the nozzle B and constitute a valve. Should any leakage occur when the handle C is freed, an adjustment of the hand screw 25 will move the wedge 23 toward the end 22 and tighten the pressure on the tube to cut off the flow of water. The bore 1 has a portion 27 disposed opposite the button 26 so as to prevent the tube 2 from being moved out of alignment with the bore 1 by the pressure of the button thereagainst.

From the foregoing description of the various parts of the device, the operation thereof may be readily understood.

When using the device, the hose 2 is connected to the house water faucet by any means, not shown. The valve lever C cooperates with the wedge 23 to close the tube 2 so as to prevent water from entering the nozzle B. When the operator wishes to spray the clothes, he grasps the casing A in the hand so that the exposed portion 28 of the lever C is received in the palm of the hand. The hand is now moved to press the portion 28 against the palm and this will move the end 22 away from the tube 2 a distance sufficient to permit water to flow into the nozzle B under pressure. The water in issuing from the nozzle orifice 11 will be atomized and the coarseness or fineness of the atomization is controlled by the adjustment of the knob 19.

The device will shut itself off automatically as soon as the lever C is released and this is accomplished without the use of a spring. Should any leakage occur, the hand screw 25 can be adjusted to overcome it. The casing A is made of a size and shape to be conveniently grasped by one hand. The same hand is used to depress the portion 28 of the lever valve for turning on the water, thus leaving the other hand free to handle the clothes while they are being sprayed. The casing in actual practice may comprise two halves held together by screws, not shown. This would permit the casing to be opened and the nozzle B and tube 2 to be removed or inspected.

In actual practice, the conical opening 11 will have its inner end that lies adjacent to the inner face 13, provided with a cylindrical bore which is very short in length. At the outer end of this bore and before the conical portion is reached, the orifice will have a shoulder or flat face that is perpendicular to the orifice axis. The outer edge of the flat face is circular and merges into the conical portion of the opening which in turn extends to the outer end surface of the nozzle.

Should the conical opening extend all the way to the surface 13 without the flat portion and the very thin cylindrical portion, an annoying drip would take place at the nozzle. The construction just described avoids this drip. The conical opening 11 permits the nozzle end to be thick to withstand the water pressure and still permit the water to be formed into a spray.

I claim:

A valve for a clothes sprinkler comprising a body adapted to be grasped in one hand and enclosing a flexible tube connectible to a source of water supply under pressure, the body having an outlet communicating with the tube, an adjustable support concealed in the body and contacting the tube, a hand lever pivotally carried by the body and having a short arm enclosed by the body whose end is designed to compress the tube against the concealed support for cutting off the water supply to the outlet, and a manually depressible long arm whose end bears against the tube, the water pressure exerting sufficient force and the ratio of the lengths of the arms being such that a freeing of the long arm from manual depression by the same hand will permit it to move under the pressure of water and cause the short arm to press the tube against the support for cutting off the flow of water to the outlet, and manually adjustable means for adjusting the support toward and away from the short arm to regulate the valve effect produced by the support and short arm.

RALPH W. MATTISON.

REFERENCES CITED

The following references are of record in the file of this patent:

UNITED STATES PATENTS

| Number | Name | Date |
|---|---|---|
| Re. 5,113 | Bruce | Oct. 29, 1872 |
| 192,584 | Lapham | July 3, 1877 |
| 226,588 | Amor et al. | Apr. 20, 1880 |
| 729,423 | Scheiber | May 26, 1903 |
| 1,033,959 | Smith | July 30, 1912 |
| 1,561,646 | Hull | Nov. 17, 1925 |
| 1,604,252 | Banfil | Oct. 26, 1926 |
| 1,761,721 | Gipe | June 3, 1930 |
| 2,116,833 | Jenks | May 10, 1938 |
| 2,113,147 | Mortimore | Oct. 11, 1938 |
| 2,167,952 | Jordan | Aug. 1, 1939 |

FOREIGN PATENTS

| Number | Country | Date |
|---|---|---|
| 621,883 | France | of 1927 |